(12) United States Patent
Ni (10) Patent No.: US 10,843,816 B2
(45) Date of Patent: Nov. 24, 2020

(54) PHOTOGRAPHIC ASSEMBLY AND UNMANNED AERIAL VEHICLE HAVING SAME

(71) Applicant: AUTEL ROBOTICS CO., LTD., Guangdong (CN)

(72) Inventor: Feng Ni, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 159 days.

(21) Appl. No.: 15/845,297

(22) Filed: Dec. 18, 2017

(65) Prior Publication Data
US 2018/0297716 A1    Oct. 18, 2018

Related U.S. Application Data

(63) Continuation of application No. PCT/CN2017/101288, filed on Sep. 11, 2017.

(30) Foreign Application Priority Data

Apr. 17, 2017  (CN) .......................... 2017 1 0248215

(51) Int. Cl.
*B64D 47/08*    (2006.01)
*B64C 27/00*    (2006.01)
(Continued)

(52) U.S. Cl.
CPC ............ *B64D 47/08* (2013.01); *B64C 27/001* (2013.01); *B64C 39/024* (2013.01);
(Continued)

(58) Field of Classification Search
CPC ..... B64D 47/08; B64C 27/001; B64C 39/024; B64C 2201/127; G03B 15/006; G03B 17/561; G05D 1/0094
(Continued)

(56) References Cited

U.S. PATENT DOCUMENTS 9,854,165 B2 * 12/2017 Wang ................... B64C 39/024
2009/0207239 A1 * 8/2009 Warmerdam ........ H02K 41/031
                                                        348/61
(Continued)

FOREIGN PATENT DOCUMENTS

CN    201591273 U    9/2010
CN    205273847 U    6/2016
(Continued)

OTHER PUBLICATIONS

Kodak Digital devices, https://web.archive.org/web/20160818110022/http://kodakpixpro.com/Americas/cameras/vrcamera/sp3604k/,Aug. 18, 2016, Internet Archive Wayback Machine (Year: 2016).*
(Continued)

*Primary Examiner* — Joseph G Ustaris
*Assistant Examiner* — Jimmy S Lee (57) ABSTRACT

The present invention relates to the field of aircrafts and provides a photographic assembly applied to an aircraft, where the aircraft includes a vehicle body. The photographic assembly includes: a vibration absorption member, a frame provided at the periphery of the vehicle body and connected to the vehicle body through a vibration absorption member, a gimbal connected to the frame and a camera connected to the gimbal. The frame of the photographic assembly in embodiments of the present invention can be mounted on unmanned aerial vehicle bodies of different specifications and the frame is sleeved over the vehicle body, so that the structure of the vehicle body can be designed compactly. The embodiments of the present invention further provide an unmanned aerial vehicle having the photographic assembly.

15 Claims, 6 Drawing Sheets

(51) Int. Cl.
*G05D 1/00* (2006.01)
*G03B 15/00* (2006.01)
*B64C 39/02* (2006.01)
*G03B 17/56* (2006.01)

(52) U.S. Cl.
CPC ......... *G03B 15/006* (2013.01); *G03B 17/561* (2013.01); *G05D 1/0094* (2013.01); *B64C 2201/127* (2013.01)

(58) Field of Classification Search
USPC ........................................................ 348/144
See application file for complete search history.

(56) References Cited

U.S. PATENT DOCUMENTS

| | | | |
|---|---|---|---|
| 2014/0037278 A1 | 2/2014 | Wang | |
| 2016/0198088 A1* | 7/2016 | Wang | H04N 5/2328 348/36 |
| 2016/0327206 A1 | 11/2016 | Yang et al. | |
| 2017/0210486 A1* | 7/2017 | O'Brien | G03B 7/30 |

FOREIGN PATENT DOCUMENTS

| | | |
|---|---|---|
| CN | 106043722 A | 10/2016 |
| CN | 205707360 U | 11/2016 |
| CN | 205819581 U | 12/2016 |
| CN | 106506925 A | 3/2017 |
| JP | 2016-219941 A | 12/2016 |
| WO | 2015/149263 A1 | 10/2015 |

OTHER PUBLICATIONS

Kodak Digital devices, https://web.archive.org/web/20160823103454/http://kodakpixpro.com/Americas/docs/specsheets/actioncam/sp360_4k/sp360_4k-bundles-specs-web.pdf, Aug. 23, 2016, Internet Archive Wayback Machine (Year: 2016).*
Kodak Digital devices, https://web.archive.org/web/20160822101857/http://kodakpixpro.com/Americas/, Aug. 22, 2016, Internet Archive Wayback Machine (Year: 2016).*
International Search Report dated Jan. 16, 2018; PCT/CN2017/101288.
International Search Report dated Jan. 16, 2017; PCT/CN2017/101288.
Extended European Search Report dated Jul. 5, 2018; Appln. No. 17814290.7.

* cited by examiner

PHOTOGRAPHIC ASSEMBLY AND UNMANNED AERIAL VEHICLE HAVING SAME

CROSS REFERENCE

This application is a continuation of International Application No. PCT/CN2017/101288, filed on Sep. 11, 2017, which claims priority to Chinese Patent Application No. 201710248215.9, filed on Apr. 17, 2017, both of which are hereby incorporated by reference in their entireties.

TECHNICAL FIELD

The present invention relates to the field of aircrafts, and in particular, to a photographic assembly used for an unmanned aerial vehicle and an unmanned aerial vehicle having the photographic assembly.

RELATED ART

Unmanned aerial vehicles have a wide invention prospect in disaster investigation and rescue, aerial monitoring, electric transmission line inspection, aerial photography, aerial survey, and military field.

In a current unmanned aerial vehicle, a common gimbal for implementing panorama photographic needs to be fixedly connected to two groups of cameras in a vertical direction, and carry out vibration absorption processing on the two groups of cameras and a connecting member thereof. Such a structure requires a special hollow space in a vehicle body of the unmanned aerial vehicle, so as to arrange the gimbal. As a result, the vehicle body is not compact enough and due to the hollow structure, components of the vehicle body cannot be integrated together, thus wasting the space of the unmanned aerial vehicle.

SUMMARY

To solve the foregoing technical problem, embodiments of the present invention provide a photographic assembly and an unmanned aerial vehicle having the photographic assembly. The vehicle body of the unmanned aerial vehicle having the photographic assembly has a compact structure.

To solve the foregoing technical problem, the embodiments of the present invention provide the following technical solutions:

A photographic assembly, applied to an aircraft that comprises a vehicle body, where the photographic assembly includes:

a vibration absorption member;

a frame, provided at the periphery of the vehicle body and connected to the vehicle body through the vibration absorption member;

a gimbal, connected to the frame; and a camera, connected to the gimbal.

In an embodiment of the present invention, the frame includes a first frame portion and a second frame portion which is disposed opposite to the first frame portion.

In an embodiment of the present invention, the first frame portion and the second frame portion are connected in a detachable manner.

In an embodiment of the present invention, the first frame portion and the second frame portion are integrally formed.

In an embodiment of the present invention, the first frame portion includes a first mounting arm and first extension arms bending and extending from two ends of the first mounting arm respectively;

the second frame portion includes a second mounting arm and second extension arms bending and extending from two ends of the second mounting arm respectively; and the first extension arm is connected to the second extension arm.

In an embodiment of the present invention, the first mounting arm is parallel to the second mounting arm.

In an embodiment of the present invention, the first mounting arm is substantially perpendicular to the first extension arm; and the second mounting arm is substantially perpendicular to the second extension arm.

In an embodiment of the present invention, the frame formed by the first frame portion and the second frame portion is rectangular.

In an embodiment of the present invention, the frame is rectangular.

In an embodiment of the present invention, the vibration absorption member includes a first vibration absorption member connected between the first mounting arm and the vehicle body and/or a second vibration absorption member connected between the second mounting arm and the vehicle body.

In an embodiment of the present invention, the vibration absorption member includes a third vibration absorption member connected between the first extension arm and the vehicle body and/or a fourth vibration absorption member connected between the second extension arm and the vehicle body.

In an embodiment of the present invention, the gimbal includes a first gimbal mounted on the first mounting arm and/or a second gimbal mounted on the second mounting arm.

In an embodiment of the present invention, when the first mounting arm is equipped with the first gimbal, the camera includes a first camera connected to the first gimbal; and when the second mounting arm is equipped with the second gimbal, the camera further includes a second camera connected to the second gimbal.

In an embodiment of the present invention, the first frame portion includes a first connecting block and first connecting arms extending outward from the first connecting block;

the second frame portion includes a second connecting block and second connecting arms extending outward from the second connecting block; and the first connecting arm is connected to the second connecting arm.

In an embodiment of the present invention, the first frame portion further includes third connecting arms bending and extending along opposite directions from the first connecting block, and the first connecting arm and the third connecting arm are disposed in a staggered manner;

the second frame portion includes fourth connecting arms bending and extending along opposite directions from the second connecting block, and the second connecting arm and the fourth connecting arm are disposed in a staggered manner; and the third connecting arm is connected to the fourth connecting arm.

In an embodiment of the present invention, a plane where the first connecting arms are located in is perpendicular to a plane where the third connecting arms are located in.

In an embodiment of the present invention, a plane where the second connecting arms are located in is perpendicular to a plane where the fourth connecting arms are located in.

In an embodiment of the present invention, the first connecting arms and the second connecting arms form a first rectangle; and the third connecting arms and the fourth connecting arms form a second rectangle.

In an embodiment of the present invention, the first rectangle is perpendicular to the second rectangle.

In an embodiment of the present invention, the shape of the first connecting arm is the same as that of the third connecting arm; and the shape of the second connecting arm is the same as that of the fourth connecting arm.

In an embodiment of the present invention, the vibration absorption member includes a fifth vibration absorption member connected between the first connecting arm and the vehicle body and/or a sixth vibration absorption member connected between the second connecting arm and the vehicle body.

In an embodiment of the present invention, the first connecting arm includes a first extension portion extending outward from the first connecting block and second extension portions bending and extending from the first extension portion respectively; and the second connecting arm includes a third extension portion extending outward from the second connecting block and fourth extension portions bending and extending from the third extension portion respectively.

In an embodiment of the present invention, the fifth vibration absorption member is connected between the first extension portion and the vehicle body and the sixth vibration absorption member is connected between the third extension portion and the vehicle body.

In an embodiment of the present invention, the vibration absorption member includes a seventh vibration absorption member connected between the second extension portion and the vehicle body and/or an eighth vibration absorption member connected between the fourth extension portion and the vehicle body.

In an embodiment of the present invention, the first connecting block is annular and the second connecting block is annular; or the first connecting block is a rectangular block and the second connecting block is a rectangular block.

In an embodiment of the present invention, the first connecting block includes a first ring arm and a first through hole surrounded by the first ring arm; and the second connecting block includes a second ring arm and a second through hole surrounded by the second ring arm.

In an embodiment of the present invention, the gimbal includes a first gimbal mounted on the first ring arm and a second gimbal mounted on the second ring arm; and the camera includes a first camera connected to the first gimbal and a second camera connected to the second gimbal.

In an embodiment of the present invention, the vibration absorption member is a vibration absorption ball.

In an embodiment of the present invention, the number of the vibration absorption member is 2.

In an embodiment of the present invention, the frame is a rigid frame.

In an embodiment of the present invention, the frame is made of magnalium alloy.

To solve the technical problem thereof, the present invention further provides an unmanned aerial vehicle, including a vehicle body, an arm connected to the vehicle body and a power assembly connected to the arm, where the unmanned aerial vehicle further includes a photographic assembly connected to the vehicle body, the photographic assembly including:
    a vibration absorption member;
    a frame, provided at the periphery of the vehicle body and connected to the vehicle body through the vibration absorption member;
    a gimbal, connected to the frame; and
    a camera, connected to the gimbal.

In an embodiment of the present invention, the frame includes a first frame portion and a second frame portion which is disposed opposite to the first frame portion.

In an embodiment of the present invention, the first frame portion and the second frame portion are connected in a detachable manner.

In an embodiment of the present invention, the first frame portion and the second frame portion are integrally formed.

In an embodiment of the present invention, the first frame portion includes a first mounting arm and first extension arms bending and extending from two ends of the first mounting arm respectively;
    the second frame portion includes a second mounting arm and second extension arms bending and extending from two ends of the second mounting arm respectively; and
    the first extension arm is connected to the second extension arm.

In an embodiment of the present invention, the first mounting arm is parallel to the second mounting arm.

In an embodiment of the present invention, the first mounting arm is substantially perpendicular to the first extension arm; and the second mounting arm is substantially perpendicular to the second extension arm.

In an embodiment of the present invention, the frame formed by the first frame portion and the second frame portion is rectangular.

In an embodiment of the present invention, the frame is rectangular.

In an embodiment of the present invention, the vibration absorption member includes a first vibration absorption member connected between the first mounting arm and the vehicle body and/or a second vibration absorption member connected between the second mounting arm and the vehicle body.

In an embodiment of the present invention, the vibration absorption member includes a third vibration absorption member connected between the first extension arm and the vehicle body and/or a fourth vibration absorption member connected between the second extension arm and the vehicle body.

In an embodiment of the present invention, the gimbal includes a first gimbal mounted on the first mounting arm and/or a second gimbal mounted on the second mounting arm.

In an embodiment of the present invention, when the first mounting arm is equipped with the first gimbal, the camera includes a first camera connected to the first gimbal; and when the second mounting arm is equipped with the second gimbal, the camera further includes a second camera connected to the second gimbal.

In an embodiment of the present invention, the first frame portion includes a first connecting block and first connecting arms extending outward from the first connecting block;
    the second frame portion includes a second connecting block and second connecting arms extending outward from the second connecting block;
    the first connecting arm is connected to the second connecting arm.

In an embodiment of the present invention, the first frame portion further includes third connecting arms extending outward from the first connecting block, and the first connecting arm and the third connecting arm are disposed in a staggered manner;

the second frame portion includes fourth connecting arms extending outward from the second connecting block, and the second connecting arm and the fourth connecting arm are disposed in a staggered manner; and the third connecting arm is connected to the fourth connecting arm.

In an embodiment of the present invention, a plane where the first connecting arms are located in is perpendicular to a plane where the third connecting arms are located in.

In an embodiment of the present invention, a plane where the second connecting arms are located in is perpendicular to a plane where the fourth connecting arms are located in.

In an embodiment of the present invention, the first connecting arms and the second connecting arms form a first rectangle; and the third connecting arms and the fourth connecting arms form a second rectangle.

In an embodiment of the present invention, the first rectangle is perpendicular to the second rectangle.

In an embodiment of the present invention, the shape of the first connecting arm is the same as that of the third connecting arm; and the shape of the second connecting arm is the same as that of the fourth connecting arm.

In an embodiment of the present invention, the vibration absorption member includes a fifth vibration absorption member connected between the first connecting arm and the vehicle body and/or a sixth vibration absorption member connected between the second connecting arm and the vehicle body.

In an embodiment of the present invention, the first connecting arm includes a first extension portion extending outward from the first connecting block and second extension portions bending and extending from the first extension portion respectively; and the second connecting arm includes a third extension portion extending outward from the second connecting block and fourth extension portions bending and extending from the third extension portion respectively.

In an embodiment of the present invention, the fifth vibration absorption member is connected between the first extension portion and the vehicle body and the sixth vibration absorption member is connected between the third extension portion and the vehicle body.

In an embodiment of the present invention, the vibration absorption member includes a seventh vibration absorption member connected between the second extension portion and the vehicle body and/or an eighth vibration absorption member connected between the fourth extension portion and the vehicle body.

In an embodiment of the present invention, the first connecting block is annular and the second connecting block is annular; or the first connecting block is a rectangular block and the second connecting block is a rectangular block.

In an embodiment of the present invention, the first connecting block includes a first ring arm and a first through hole surrounded by the first ring arm; and the second connecting block includes a second ring arm and a second through hole surrounded by the second ring arm.

In an embodiment of the present invention, the gimbal includes a first gimbal mounted on the first ring arm and a second gimbal mounted on the second ring arm; and the camera includes a first camera connected to the first gimbal and a second camera connected to the second gimbal.

In an embodiment of the present invention, the vibration absorption member is a vibration absorption ball.

In an embodiment of the present invention, the number of the vibration absorption member is 2.

In an embodiment of the present invention, the frame is a rigid frame.

In an embodiment of the present invention, the frame is made of magnalium alloy.

Compared with the prior art, the frame of the photographic assembly in the embodiments of the present invention can be mounted on unmanned aerial vehicle bodies of different specifications. Besides, the frame is sleeved over the vehicle body so that the structure of the vehicle body can be designed compactly. The unmanned aerial vehicle in the embodiments of the present invention can absorb vibrations of the gimbal and camera by using the frame provided at the periphery of the vehicle body and the vibration absorption member sandwiched between the frame and the vehicle body, so that the camera can carry out photographing stably during working, thereby obtaining high-quality images.

BRIEF DESCRIPTION OF THE DRAWINGS

Exemplary descriptions of one or more embodiments are provided through accompanying drawings corresponding to the one or more embodiments. These exemplary descriptions do not constitute any limitation on the embodiments. Elements having identical reference numerals in the drawings represent similar elements. Unless particularly stated, figures in the accompanying drawings do not constitute any proportional limitation.

DETAILED DESCRIPTION

For ease of understanding the present invention, the present invention is described in further detail below with reference to the accompanying drawings and specific implementations. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Terms such as "perpendicular", "horizontal", "left", "right", "inner", "outer" and similar expressions used in this specification are merely used for the purpose of description.

Unless otherwise defined, meanings of all technical and scientific terms used in this specification are the same as that usually understood by persons skilled in the technical field to which the present invention belongs. The terms used in the specification of the present invention are merely intended to describe specific implementations rather than limit the present invention. A term "and/or" used in this specification includes any or all combinations of one or more related listed items.

Figure 1:
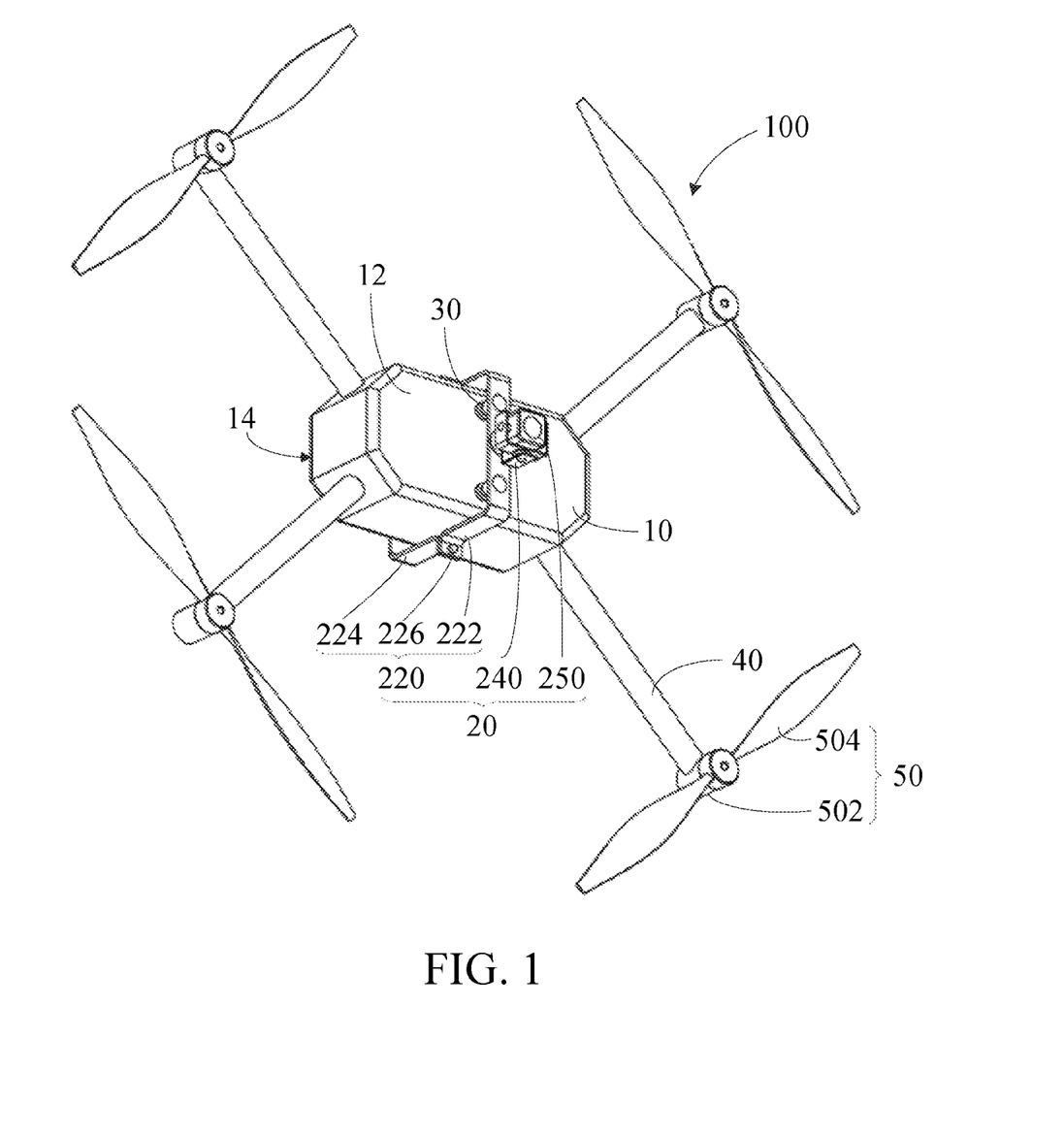
FIG. 1 is a stereogram of an unmanned aerial vehicle according to an embodiment of the present invention.
Figure 2:
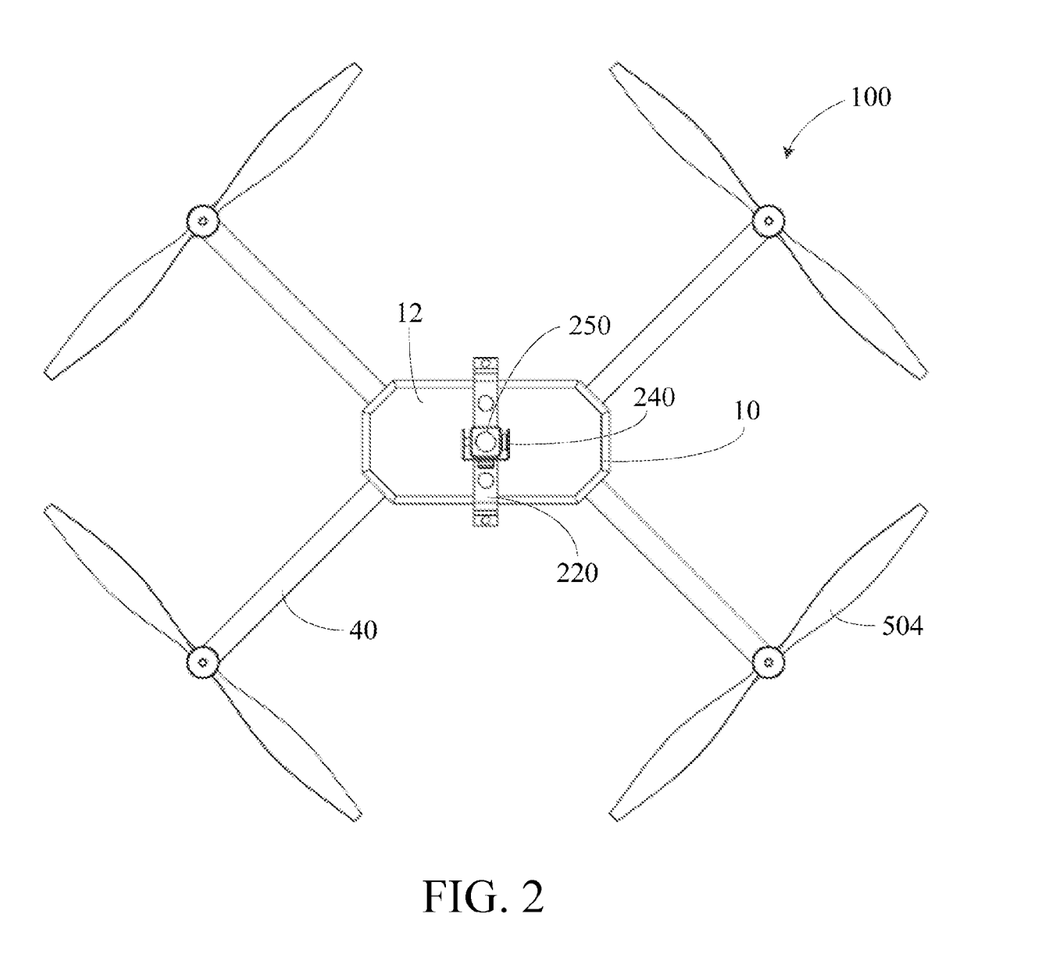
FIG. 2 is a top view of an unmanned aerial vehicle according to an embodiment of the present invention.
Figure 3:
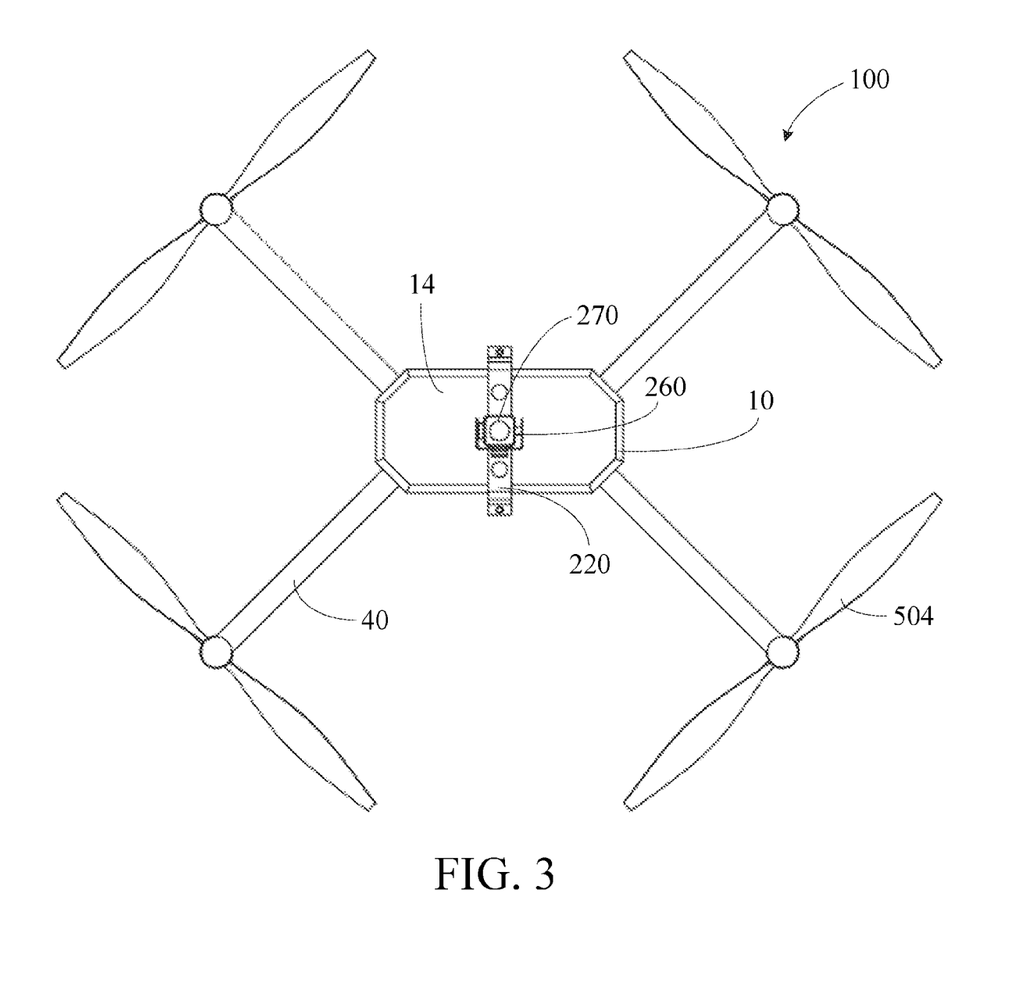
FIG. 3 is a bottom view of an unmanned aerial vehicle according to an embodiment of the present invention.

Referring to FIG. 1 to FIG. 3, an unmanned aerial vehicle 100 provided by an embodiment of the present invention includes a vehicle body 10, at least one arm 40 connected to the vehicle body 10, a power assembly provided on the arm 40 and a photographic assembly 20 connected to the vehicle body 10.

A control circuit assembly consisting of electronic devices such as an MCU is provided in the vehicle body 10. The control circuit assembly includes multiple control modules, for example, a flight control module for controlling a flight attitude of the unmanned aerial vehicle, a Beidou module for navigating the unmanned aerial vehicle and a data processing module for processing environment information acquired by related vehicle-mounted devices.

In an embodiment of the present invention, the vehicle body 10 includes a first surface 12 and a second surface 14 that are disposed opposite to the first surface 12. The first surface 12 and the second surface 14 are planes, which are provided at an upper side and a lower side of the vehicle body 10 respectively. In some other embodiments, the first surface 12 and the second surface 14 may be surfaces of other shapes, such as curved surfaces. The present invention does not make any limitation on the shape of the vehicle body 10.

Each power assembly 50 includes a motor 502 and a propeller 504. The propeller 504 is mounted on a rotation shaft of the motor 502. The motor 502 is mounted at an end, which is away from the vehicle body 10, of an arm 40. In this embodiment, the number of the arms 40 is 4 and the number of the power assemblies 50 is 4. The four arms 40 may be uniformly distributed at the periphery of the vehicle body 10. The motor 502 of each power assembly 50 is mounted at an end, which is away from the vehicle body 10, of a corresponding arm 40. In some other embodiments, the number of arms 40 may also be increased or decreased according to situations. For example, the number of arms 40 is reduced to 1 or 2 or increased to 6.

The photographic assembly 20 includes a frame 220, a vibration absorption member 30 sandwiched between the frame 220 and the vehicle body 10, a gimbal connected to the frame 220 and a camera connected to the gimbal. In an embodiment of the present invention, the gimbal includes a first gimbal 240 and a second gimbal 260 that are disposed on opposite sides of the frame 220 respectively. The camera includes a first camera 250 connected to the first gimbal 240 and a second camera 270 connected to the second gimbal 260. In other embodiments, the number of gimbals and the number of cameras may be determined as required.

As the two gimbals are both mounted on the frame 220, the frame 220 needs to have high rigidity to ensure that vibrations generated by the aircraft can be transferred to the two gimbals at the same time. In an embodiment of the present invention, the frame 220 is made of a rigid material such as magnalium alloy. The frame 220 is sleeved over the vehicle body 10. In an embodiment of the present invention, the frame 220 includes a first frame portion 222 and a second frame portion 224 which is disposed opposite to the first frame portion 222. The first frame portion 222 and the second frame portion 224 form a rectangle. In some other embodiments, the frame 220 may be of another shape such as a hexagon or a circle, as long as the frame 220 can be used for fixing the gimbal and the camera.

Figure 4:
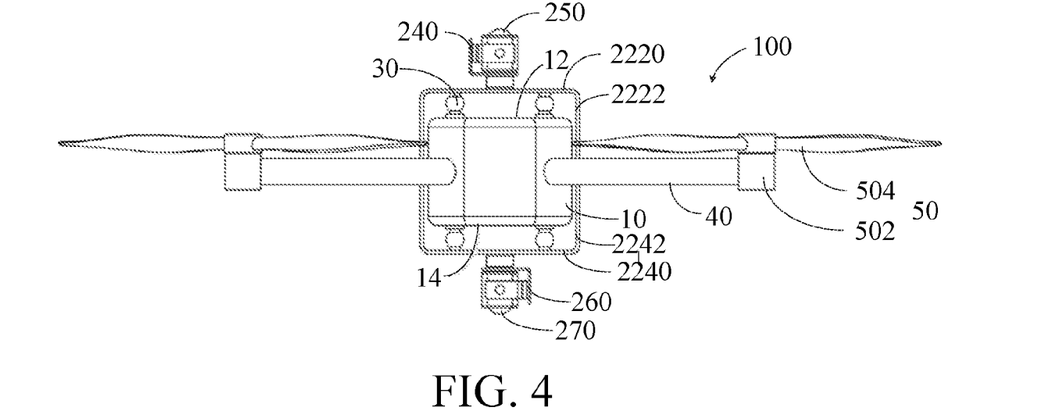
FIG. 4 is a front view of an unmanned aerial vehicle according to an embodiment of the present invention.
Figure 5:
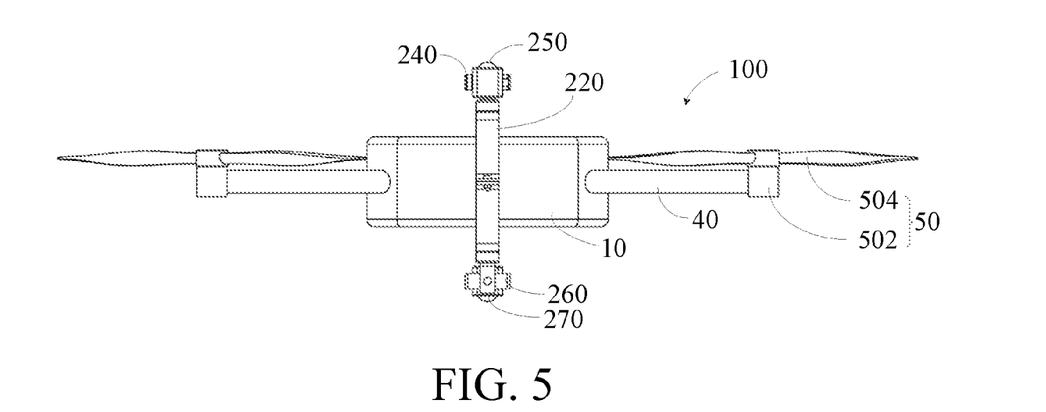
FIG. 5 is a side view of an unmanned aerial vehicle according to an embodiment of the present invention.

Referring to FIG. 4 and FIG. 5, in an embodiment, the first frame portion 222 includes a first mounting arm 2220 and first extension arms 2222 bending and extending from two ends of the second mounting arm 2220 respectively. The first extension arm 2222 is substantially perpendicular to the first mounting arm 2220. The second frame portion 224 includes a second mounting arm 2240 and second extension arms 2242 bending and extending from two ends of the second mounting arm 2240 respectively. The second extension arm 2242 is substantially perpendicular to the second mounting arm 2240. In this embodiment, the first mounting arm 2220 and the second mounting arm 2240 are provided at an upper side and a lower side of the vehicle body 10 in a parallel manner. The first extension arm 2222 and the second extension arm 2242 are provided at a left side and a right side of the vehicle body 10 in a parallel manner. Moreover, tail ends of the first extension arm 2222 and the second extension arm 2242 are locked by using a fixing member 226. In an embodiment of the present invention, the fixing member 226 is a screw and the number of the fixing members 226 is two. In other embodiments, the fixing member 226 may also be a part that can be assembled and disassembled conveniently, such as a buckle. In some embodiments, tail ends of one first extension arm 2222 and one second extension arm 2242 are hinged, and tail ends of the other first extension arm 2222 and the other second extension arm 2242 are fixed together by using the fixing member 226. Alternatively, the frame 220 includes a frame portion and a fixing member, and the frame portion is bent to enclose the vehicle body 10 and two ends of the frame portion are fixed together by using the fixing member.

The frame 220 employs a split structure, so that the frame 220 can be conveniently mounted on vehicle bodies 10 of different specifications. In some other embodiments, the frame 220 may also be of an integral structure. In some embodiments, the length of the first frame portion 222 or the second frame portion 224 is adjustable. For example, a telescopic structure is employed to adapt to aircrafts of different sizes.

In an embodiment of the present invention, the number of the vibration absorption members 30 is four. The vibration absorption member 30 include a first vibration absorption member connected between the first mounting arm 2220 and the first surface 12 of the vehicle body 10 and a second vibration absorption member connected between the second mounting arm 2240 and the second surface 14 of the vehicle body 10. In other possible embodiments, the vibration absorption member 30 may further include a third vibration absorption member connected between the first extension arm 2222 and the vehicle body 10 and/or a fourth vibration absorption member between the second extension arm 2242 and the vehicle body 10, so as to enhance the vibration absorption effect. The vibration absorption member 30 is fixedly connected between the vehicle body and the frame such that high-frequency vibrations which the gimbal cannot respond to are removed through filtering. In addition, the present invention does not limit the number of vibration absorption members. The number of vibration absorption members can be selected according to requirements.

In an embodiment of the present invention, the vibration absorption member 30 is a vibration absorption ball, which is made of an elastic material such as a rubber material. In some other embodiments, the vibration absorption member 30 may be an elastic vibration absorption column or other vibration absorption elements, as long as vibration absorption between the frame 220 and the vehicle body 10 can be achieved. The number of the vibration absorption members 30 is at least two. The arrangement manner of the vibration absorption members 30 between the vehicle body 10 and the frame 220 is not limited, as long as the vibration absorption requirement between the frame 220 and the vehicle body 10 can be met. For example, the vibration absorption members 30 may also be uniformly arranged at the periphery of the vehicle body 10.

The first gimbal 240 is fixed on the first mounting arm 2220. The first gimbal 240 and the vehicle body 10 are located on two opposite sides of the first mounting arm 2220 respectively. Similarly, the second gimbal 260 is fixed on the second mounting arm 2240. The second gimbal 260 and the vehicle body 10 are located on two opposite sides of the second mounting arm 2240 respectively. The first gimbal 240 and the second gimbal 260 are symmetrically disposed at the upper side and the lower side of the vehicle body 10 with respect to the vehicle body 10. In some other embodiments, the first gimbal 240 and the second gimbal 260 may also be fixed on the frame 220 and are symmetrically or asymmetrically disposed on the left side and right side or on the front side and rear side of the vehicle body 10 with respect to the vehicle body 10.

Both the first gimbal 240 and the second gimbal 260 are triaxial stability augmentation gimbals. Each triaxial stability augmentation gimbal 240/260 augments stability of the first camera 250 or second camera 270 during flight in three axial directions: yaw, pitch and roll. The pitch axis direction is perpendicular to the roll axis direction. The yaw axis direction is perpendicular to the pitch axis direction and the roll axis direction.

Each gimbal 240/260 includes a first motor, a second motor and a third motor. The central axis of the rotor of the first motor is located in the roll axis direction. The central axis of the rotor of the second motor is located in the pitch axis direction. The central axis of the rotor of the third motor is located in the yaw axis direction. The stator of the third motor is mounted on the frame 220 through a mounting base. The rotor of the third motor is connected to the stator of the second motor. The rotor of the second motor is connected to the stator of the first motor.

In some embodiments, the third motor may be omitted. The stator of the second motor is mounted on the frame 220 through a mounting base.

The first camera 250 is fixedly mounted on the rotor of the first motor of the first gimbal 240. The second camera 270 is fixedly mounted on the rotor of the first motor of the second gimbal 260. The first camera 250 and the second camera 270 are disposed towards opposite directions.

During flight of the unmanned aerial vehicle 100 of this embodiment, as the frame 220 has sufficient rigidity, low-frequency vibrations transferred to the first gimbal 240 and the second gimbal 260 can be considered as being highly consistent. In this case, the motors on the three axes of the first gimbal 240 and the second gimbal 260 output same rotations to maintain that the stability of the first camera 250 and the second camera 270 is augmented at the same time. In such a case, the first camera 250 and the second camera 270 can stably acquire high-quality images, which can be stitched to form a panoramic image.

The unmanned aerial vehicle 100 in the embodiment of the present invention absorbs vibrations of the first camera 250 and the second camera 270 by using the vibration absorption member 30, the frame 220, the first gimbal 240 and the second gimbal 260, so that the first camera 250 and the second camera 270 can carry out photographing stably during working to acquire high-quality images. In addition, the frame 220 can be mounted out of the vehicle body 10, and therefore the vehicle body 10 of the unmanned aerial vehicle 100 can be designed compactly. Finally, the frame 220 and the vibration absorption member 30 are compatible to vehicle bodies 10 of different specifications.

Figure 6:
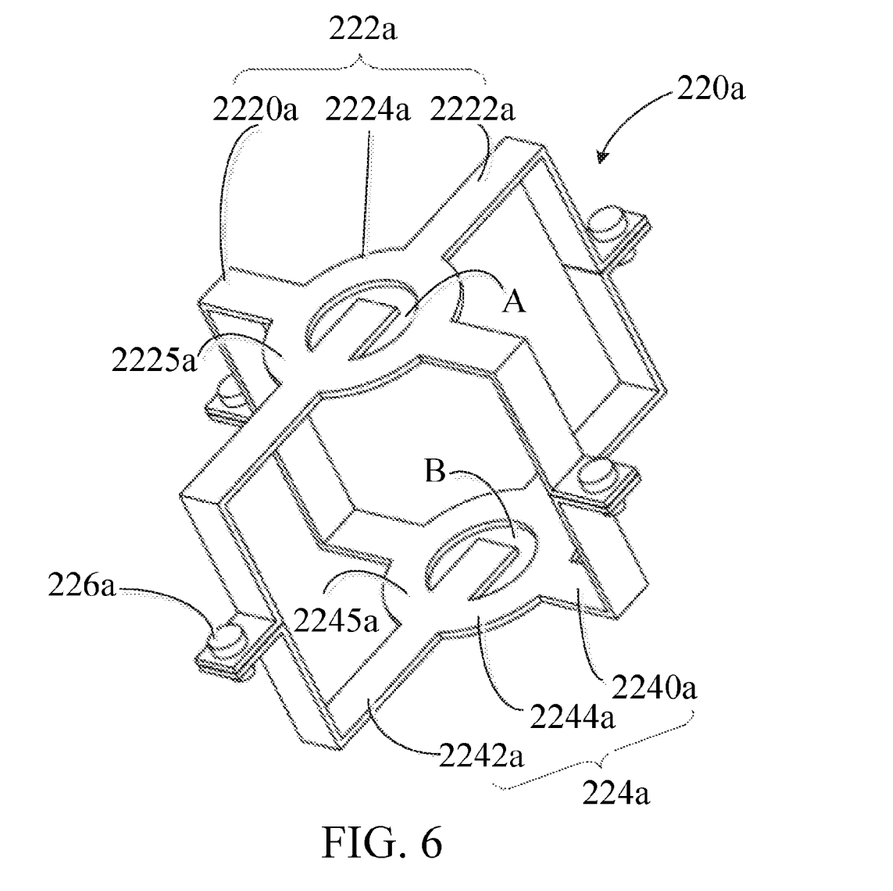
FIG. 6 is a stereogram of a frame of an unmanned aerial vehicle according to some embodiments of the present invention.
Figure 7:
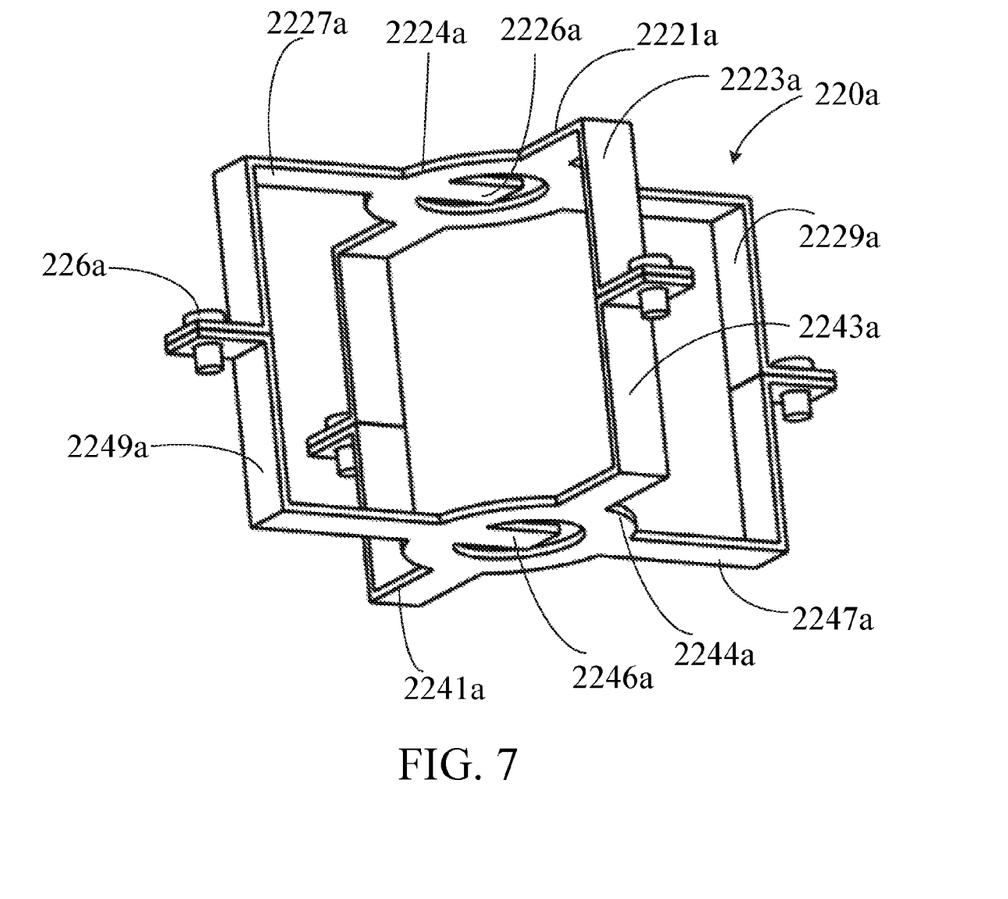
FIG. 7 is a stereogram of the frame in FIG. 6 from another angle.

Referring to FIG. 6 and FIG. 7, a frame 220a provided by some embodiments of the present invention includes a first frame portion 222a, a second frame portion 224a which is disposed opposite to the first frame portion 222a, and a vibration absorption member (not shown in the figure).

The first frame portion 222a includes a first connecting block 2224a, two first connecting arms 2220a extending outward from the first connecting block 2224a and two third connecting arms 2222a extending outward from the first connecting block 2224a. A plane where the first connecting arms 2220a are located in is perpendicular to a plane where the third connecting arms 2222a are located in.

The first connecting block 2224a is of a hollow structure and is annular as a whole. The first connecting block 2224a includes a first ring arm 2225a, a first through hole A surrounded by the first ring arm 2225a and a first support arm 2226a which extends from the first ring arm 2225a and is located in the first through hole A. In some other embodiments, the first connecting block 2224a may also be of a hollow structure in another shape such as an ellipse, a square or a rectangle. The first support arm 2226a may also be omitted.

The first connecting arm 2220a includes a first extension portion 2221a extending outward from the first connecting block 2224a and second extension portions 2223a bending and extending from the first extension portion 2221a respectively.

The third connecting arm 2222a includes a fifth extension portion 2227a extending outward from the first connecting block 2224a and sixth extension portions 2229a bending and extending from the fifth extension portion 2227a respectively.

In an embodiment of the present invention, the shape of the first connecting arm 2220a is the same as that of the third connecting arm 2222a.

The second frame portion 224a includes a second connecting block 2244a, two second connecting arms 2240a extending outward from the second connecting block 2244a and two fourth connecting arms 2242a extending outward from the second connecting block 2244a.

The second connecting block 2244a is of a hollow structure and is annular as a whole. The second connecting block 2244a includes a second ring arm 2245a, a second through hole B surrounded by the second ring arm 2245a and a second support arm 2246a which extends from the second ring arm 2245a and is located in the second through hole B. In some other embodiments, the second connecting block 2244a may also be of a hollow structure in another shape such as an ellipse, a square or a rectangle. The first support arm 2245a may also be omitted.

The second connecting arm 2240a includes a third extension portion 2241a extending outward from the second connecting block 2244a and fourth extension portions 2243a bending and extending from the third extension portion 2241a respectively.

The fourth connecting arm 2242a includes a seventh extension portion 2247a extending outward from the second connecting block 2244a and eighth extension portions 2249a bending and extending from the seventh extension portion 2247a respectively.

In an embodiment of the present invention, the shape of the second connecting arm 2240a is the same as that of the fourth connecting arm 2242a.

A tail end of the second extension portion 2223a and a tail end of the fourth extension portion 2243a as well as a tail end of the sixth extension portion 2229a and a tail end of the eighth extension portion 2249a are connected through fixing members 226a. The first connecting arms 2220 and the second connecting arms 2240a form a first rectangle. The third connecting arms 2222a and the fourth connecting arms 2242a form a second rectangle. The first rectangle is perpendicular to the second rectangle. In this embodiment, the fixing member 226a is a screw. In other possible embodiments, the fixing member 226a may also be a part that can be assembled and disassembled conveniently, such as a buckle.

In an embodiment of the present invention, the vibration absorption member includes a fifth vibration absorption member connected between the first extension portion 2221a and the vehicle body and/or a sixth vibration absorption member connected between the third extension portion 2241a and the vehicle body. The number of the vibration absorption member is 2. The specific number of vibration absorption members may be set according to requirements. For example, the vibration absorption member may further include a seventh vibration absorption member provided between the second extension portion 2223a and the vehicle body and/or an eighth vibration absorption member between the fourth extension portion 2243a and the vehicle body. The vibration absorption member may even further include a vibration absorption member provided between the fifth extension portion 2227a and the vehicle body and/or a vibration absorption member between the seventh extension portion 2247a and the vehicle body. Alternatively, the vibration absorption member may include a vibration absorption member provided between the sixth extension portion 2229a and the vehicle body and/or a vibration absorption member between the eighth extension portion 2249a and the vehicle body.

The first gimbal 240 is mounted on the first connecting block 2224a and abuts against the first support arm 2226a. The second gimbal 260 is mounted on the second connecting block 2244a and abuts against the second support arm 2246a. The first camera 250 is fixedly mounted on the rotor of the first motor of the first gimbal 240. The second camera 270 is fixedly mounted on the rotor of the first motor of the second gimbal 260.

The vibration absorption members 30 may be disposed above, below, on the left and right of, in front of, and behind the vehicle body 10, so that vibrations generated by the vehicle body 10 can be better reduced by the vibration absorption members 30. In addition, tail ends of the first support arm 2226a and the second support arm 2246a are suspended, so as to further reduce vibrations transferred from the vehicle body 10 to the first gimbal 240 and the second gimbal 260.

Finally, it should be noted that, the foregoing embodiments are merely used for illustrating rather than limiting the technical solutions of the present invention. According to the idea of the present invention, technical features in the foregoing embodiments or in different embodiments may also be combined. Steps may be implemented in any order and there exist many other changes on different aspects of the present invention described above. For brevity, the changes are not provided in details. Although the present invention is described in detail according to the foregoing embodiments, persons of ordinary skill in the art should understand that modifications may be made on the technical solutions recorded in the foregoing embodiments or equivalent replacements may be made on some of the technical features therein. These modifications or replacements do not cause the essence of the corresponding technical solutions to depart from the scope of the technical solutions of the embodiments of the present invention.

What is claimed is:

1. A photographic assembly, applied to an aircraft that comprises a vehicle body, wherein the photographic assembly comprises:
    a vibration absorption member;
    a frame, provided at the periphery of the vehicle body and connected to the vehicle body through the vibration absorption member;
    a gimbal, connected to the frame; and
    a camera, connected to the gimbal;
    wherein the frame comprises a first frame portion and a second frame portion which is disposed opposite to the first frame portion
    wherein, the first frame portion comprises a first connecting block and first connecting arms extending outward from the first connecting block;
    the second frame portion comprises a second connecting block and second connecting arms extending outward from the second connecting block; and
    the first connecting arm is connected to the second connecting arm;
    wherein the first frame portion further comprises third connecting arms extending outward from the first connecting block, and the first connecting arm and the third connecting arm are disposed in a staggered manner;
    the second frame portion comprises fourth connecting arms extending outward from the second connecting block, and the second connecting arm and the fourth connecting arm are disposed in a staggered manner; and
    the third connecting arm is connected to the fourth connecting arm; and
    wherein
    the first connecting arms and the second connecting arms form a first rectangle; and
    the third connecting arms and the fourth connecting arms form a second rectangle.

2. The photographic assembly according to claim 1, wherein the vibration absorption member comprises a fifth vibration absorption member connected between the first connecting arm and the vehicle body and/or a sixth vibration absorption member connected between the second connecting arm and the vehicle body.

3. The photographic assembly according to claim 1, wherein
    the first connecting arm comprises a first extension portion extending outward from the first connecting block and second extension portions bending and extending from the first extension portion respectively; and
    the second connecting arm comprises a third extension portion extending outward from the second connecting block and fourth extension portions bending and extending from the third extension portion respectively.

4. The photographic assembly according to claim 3, wherein a fifth vibration absorption member is connected between the first extension portion and the vehicle body and a sixth vibration absorption member is connected between the third extension portion and the vehicle body.

5. The photographic assembly according to claim 3, wherein the vibration absorption member comprises a seventh vibration absorption member connected between the second extension portion and the vehicle body and/or an eighth vibration absorption member connected between the fourth extension portion and the vehicle body.

6. The photographic assembly according to claim 1, wherein
the first connecting block comprises a first ring arm and a first through hole surrounded by the first ring arm; and
the second connecting block comprises a second ring arm and a second through hole surrounded by the second ring arm.

7. The photographic assembly according to claim 6, wherein the gimbal comprises a first gimbal mounted on the first ring arm and a second gimbal mounted on the second ring arm; and
the camera comprises a first camera connected to the first gimbal and a second camera connected to the second gimbal.

8. An unmanned aerial vehicle, comprising a vehicle body, an arm connected to the vehicle body and a power assembly connected to the arm, wherein the unmanned aerial vehicle further comprises a photographic assembly connected to the vehicle body, the photographic assembly comprising:
a vibration absorption member;
a frame, provided at the periphery of the vehicle body and connected to the vehicle body through the vibration absorption member;
a gimbal, connected to the frame; and
a camera, connected to the gimbal;
wherein the frame comprises a first frame portion and a second frame portion which is disposed opposite to the first frame portion;
wherein the first frame portion comprises a first connecting block and first connecting arms extending outward from the first connecting block;
the second frame portion comprises a second connecting block and second connecting arms extending outward from the second connecting block;
the first connecting arm is connected to the second connecting arm; and
wherein the first connecting arms and the second connecting arms form a first rectangle; and
the third connecting arms and the fourth connecting arms form a second rectangle.

9. The unmanned aerial vehicle according to claim 8, wherein
the first frame portion further comprises third connecting arms extending outward from the first connecting block, and the first connecting arm and the third connecting arm are disposed in a staggered manner;
the second frame portion comprises fourth connecting arms extending outward from the second connecting block, and the second connecting arm and the fourth connecting arm are disposed in a staggered manner; and
the third connecting arm is connected to the fourth connecting arm.

10. The unmanned aerial vehicle according to claim 8, wherein the vibration absorption member comprises a fifth vibration absorption member connected between the first connecting arm and the vehicle body and/or a sixth vibration absorption member connected between the second connecting arm and the vehicle body.

11. The unmanned aerial vehicle according to claim 8, wherein the first connecting arm comprises a first extension portion extending outward from the first connecting block and second extension portions bending and extending from the first extension portion respectively; and
the second connecting arm comprises a third extension portion extending outward from the second connecting block and fourth extension portions bending and extending from the third extension portion respectively.

12. The unmanned aerial vehicle according to claim 11, wherein the fifth vibration absorption member is connected between the first extension portion and the vehicle body and the sixth vibration absorption member is connected between the third extension portion and the vehicle body.

13. The unmanned aerial vehicle according to claim 11, wherein the vibration absorption member comprises a seventh vibration absorption member connected between the second extension portion and the vehicle body and/or an eighth vibration absorption member connected between the fourth extension portion and the vehicle body.

14. The unmanned aerial vehicle according to claim 8, wherein
the first connecting block comprises a first ring arm and a first through hole surrounded by the first ring arm; and
the second connecting block comprises a second ring arm and a second through hole surrounded by the second ring arm.

15. The unmanned aerial vehicle according to claim 14, wherein the gimbal comprises a first gimbal mounted on the first ring arm and a second gimbal mounted on the second ring arm; and
the camera comprises a first camera connected to the first gimbal and a second camera connected to the second gimbal.

* * * * *